(12) United States Patent
Zhang (10) Patent No.: US 11,132,968 B2
(45) Date of Patent: Sep. 28, 2021

(54) GATE ON ARRAY CIRCUIT AND BUILT-IN TOUCH DISPLAY PANEL

(71) Applicant: Wuhan China Star Optoelectronics Semiconductor Display Technology Co., Ltd., Wuhan (CN)

(72) Inventor: Di Zhang, Wuhan (CN)

(73) Assignee: Wuhan China Star Optoelectronics Semiconductor Display Technology Co., Ltd., Wuhan (CN)

(*) Notice: Subject to any disclaimer, the term of this patent is extended or adjusted under 35 U.S.C. 154(b) by 8 days.

(21) Appl. No.: 16/342,540

(22) PCT Filed: Dec. 12, 2018

(86) PCT No.: PCT/CN2018/120738
§ 371 (c)(1),
(2) Date: Apr. 17, 2019

(87) PCT Pub. No.: WO2020/010798
PCT Pub. Date: Jan. 16, 2020

(65) Prior Publication Data
US 2020/0020293 A1    Jan. 16, 2020

(30) Foreign Application Priority Data

Jul. 10, 2018 (CN) .......................... 201810748961.9

(51) Int. Cl.
*G09G 3/36* (2006.01)
*G06F 3/041* (2006.01)

(52) U.S. Cl.
CPC ......... *G09G 3/3677* (2013.01); *G06F 3/0412* (2013.01); *G09G 2300/0408* (2013.01)

(58) Field of Classification Search
None
See application file for complete search history.

(56) References Cited

U.S. PATENT DOCUMENTS

| 2009/0166632 | A1 | 7/2009 | Chang |
| 2010/0001941 | A1 | 1/2010 | Shin et al. |
| 2015/0339981 | A1* | 11/2015 | Liu .................... G09G 3/3225 345/212 |
| 2017/0124976 | A1* | 5/2017 | Chen .................. G06F 3/04166 |
| 2018/0080973 | A1* | 3/2018 | Zhang ................. G11C 19/287 |
| 2019/0057668 | A1* | 2/2019 | Xiong ................. G09G 3/3696 |
| 2020/0279516 | A1* | 9/2020 | Weng .................. G09G 3/3266 |

FOREIGN PATENT DOCUMENTS

| CN | 1942071 | 4/2007 |
| CN | 105047163 | 11/2015 |
| CN | 107068084 | 8/2017 |
| JP | 2010-015125 | 1/2010 |

* cited by examiner

*Primary Examiner* — Andre L Matthews (57) ABSTRACT

A gate on array (GOA) circuit and a built-in touch display panel are provided. The GOA circuit collects a scan signal from a GOA unit, detects whether the scan signal from the GOA unit is abnormal in order to identify an abnormal GOA unit, and then restores a scan signal from the abnormal GOA unit.

16 Claims, 9 Drawing Sheets

GATE ON ARRAY CIRCUIT AND BUILT-IN TOUCH DISPLAY PANEL

RELATED APPLICATIONS

This application is a National Phase of PCT Patent Application No. PCT/CN2018/120738 having International filing date of Dec. 12, 2018, which claims the benefit of priority of Chinese Patent Application No. 201810748961.9 filed on Jul. 10, 2018. The contents of the above applications are all incorporated by reference as if fully set forth herein in their entirety.

FIELD AND BACKGROUND OF THE INVENTION

The present disclosure relates to the field of liquid crystal display technology, and more particularly, to a gate on array (GOA) circuit and a built-in touch display panel.

Gate on array (GOA) technology, namely driving technology for rows of an array substrate, is that a gate-scanning driving circuit is fabricated on a thin-film transistor array substrate by utilizing an array process for a thin-film transistor liquid-crystal display so as to realize a driving method using line-by-line scanning.

Currently, with well-developed technology for integrated touch panels, built-in touch display panels are always selected for display panels. In built-in touch display panels, whether GOA circuits can output driving signals normally or not is an important factor to affect product yield.

SUMMARY OF THE INVENTION

The present disclosure provides a gate on array (GOA) circuit and a built-in touch display panel to ensure that GOA circuits can output driving signals normally.

In order to solve the above problems, the present disclosure provides technical solutions as follows:

the present disclosure provides a GOA circuit, including: at least one GOA unit, a GOA detection unit, and a GOA restoration unit, wherein:

a signal output end of the GOA unit is electrically connected to pixels in a built-in touch display panel, and is configured to output a scan signal to the pixels;

the GOA detection unit is electrically connected to the signal output end of the GOA unit and configured to collect the scan signal from the GOA unit and detect whether the scan signal from the GOA unit is abnormal so that an abnormal GOA unit is identified; and the GOA restoration unit is electrically connected to the signal output end of the GOA unit and configured to restore a scan signal from the abnormal GOA unit.

In the GOA circuit of the present disclosure, the GOA detection unit includes at least one signal collection unit, a collection control unit, and a pulse detection unit, wherein:

the signal collection unit is electrically connected to the signal output end of the GOA unit and configured to transmit a scan signal of a corresponding GOA unit to the pulse detection unit;

the collection control unit is electrically connected to the at least one signal collection unit and configured to output a control signal in order to turn on or turn off the at least one signal collection unit; and the pulse detection unit is configured to detect whether there exists a pulse in the scan signal from the at least one GOA unit, and if there does not, then mark a corresponding GOA unit as the abnormal GOA unit.

In the GOA circuit of the present disclosure, the signal collection unit includes a first thin-film transistor, and an output end of the collection control unit is electrically connected to a gate electrode of the first thin-film transistor.

In the GOA circuit of the present disclosure, the signal collection unit further includes a second thin-film transistor, which is used as a unidirectional turn-on device and disposed between the signal output end of the GOA unit and the first thin-film transistor.

In the GOA circuit of the present disclosure, the second thin-film transistor is a p-channel metal oxide semiconductor (PMOS) thin-film transistor, and a gate electrode and a drain electrode of the PMOS thin-film transistor are connected with a short circuit.

In the GOA circuit of the present disclosure, the second thin-film transistor is an n-channel metal oxide semiconductor (NMOS) thin-film transistor, and a gate electrode and a source electrode of the NMOS thin-film transistor are connected with a short circuit.

In the GOA circuit of the present disclosure, the GOA unit is a level transfer circuit with a positive-voltage GOA pulse, the first thin-film transistor is a PMOS thin-film transistor, the second thin-film transistor is a PMOS thin-film transistor, a source electrode of the second thin-film transistor is electrically connected to the signal output end of the GOA unit, a drain electrode of the second thin-film transistor is electrically connected to a drain electrode of the first thin-film transistor, and a source electrode of the first thin-film transistor is electrically connected to a signal input end of the pulse detection unit.

In the GOA circuit of the present disclosure, the GOA unit is a level transfer circuit with a positive-voltage GOA pulse, the first thin-film transistor is a PMOS thin-film transistor, the second thin-film transistor is an NMOS thin-film transistor, a source electrode of the second thin-film transistor is electrically connected to the signal output end of the GOA unit, a drain electrode of the second thin-film transistor is electrically connected to a drain electrode of the first thin-film transistor, and a source electrode of the first thin-film transistor is electrically connected to a signal input end of the pulse detection unit.

In the GOA circuit of the present disclosure, the GOA unit is a level transfer circuit with a negative-voltage GOA pulse, the first thin-film transistor is a PMOS thin-film transistor, the second thin-film transistor is a PMOS thin-film transistor, a drain electrode of the second thin-film transistor is electrically connected to the signal output end of the GOA unit, a source electrode of the second thin-film transistor is electrically connected to a drain electrode of the first thin-film transistor, and a source electrode of the first thin-film transistor is electrically connected to a signal input end of the pulse detection unit.

In the GOA circuit of the present disclosure, the GOA unit is a level transfer circuit with a negative-voltage GOA pulse, the first thin-film transistor is a PMOS thin-film transistor, the second thin-film transistor is an NMOS thin-film transistor, a drain electrode of the second thin-film transistor is electrically connected to the signal output end of the GOA unit, a source electrode of the second thin-film transistor is electrically connected to a drain electrode of the first thin-film transistor, and a source electrode of the first thin-film transistor is electrically connected to a signal input end of the pulse detection unit.

In the GOA circuit of the present disclosure, the pulse detection unit includes a third thin-film transistor, a voltage testing device, and a capacitor, wherein:

a gate electrode of the third thin-film transistor is electrically connected to a restoration signal, a source electrode of the third thin-film transistor is connected to a voltage level control signal, and a drain electrode of the third thin-film transistor is electrically connected to the voltage testing device and one end of the capacitor;

the other end of the capacitor is connected to a power; and the voltage testing device is configured to detect whether there exists a corresponding voltage pulse in the scan signal from the GOA unit.

In the GOA circuit of the present disclosure, the GOA unit is a level transfer circuit with a positive-voltage GOA pulse, and the voltage level control signal is a low voltage level signal.

In the GOA circuit of the present disclosure, the GOA unit is a level transfer circuit with a negative-voltage GOA pulse, and the voltage level control signal is a high voltage level signal.

In the GOA circuit of the present disclosure, the GOA restoration unit includes at least one restoration signal output unit, and wherein the restoration signal output unit is physically connected to the signal output end of the GOA unit through a restoration point and configured to output a restoration signal which is the same as a scan signal of a corresponding GOA unit.

In the GOA circuit of the present disclosure, the restoration signal output unit is connected to the signal output ends of at least two GOA units through at least two restoration points.

In the GOA circuit of the present disclosure, when the restoration point, with a conduction state and an insulation state, is in the conduction state, the restoration signal output unit is electrically connected to the signal output end of the GOA unit.

In the GOA circuit of the present disclosure, the restoration point includes a first metal layer, a second metal layer, and an insulation layer disposed between the first metal layer and the second metal layer, and wherein the first metal layer is electrically connected to the signal output end of the GOA unit, and the second metal layer is electrically connected to the restoration signal output unit.

In the GOA circuit of the present disclosure, the second metal layer is disposed on the first metal layer.

In the GOA circuit of the present disclosure, the second metal layer has a shape of a hollow rectangle, and a width of the hollow rectangle is greater than a thickness of the insulation layer.

Also, the present disclosure provides a built-in touch display panel, including the above GOA circuit.

The beneficial effect of the present disclosure is that, a GOA circuit and a built-in touch display panel, provided in the present disclosure, collect a scan signal from the GOA unit, detect whether the scan signal from the GOA unit is abnormal in order to identify an abnormal GOA unit, and then restore a scan signal from the abnormal GOA unit. Thus, it is ensured that the GOA circuit can output driving signals normally, and product yield is increased.

BRIEF DESCRIPTION OF THE SEVERAL VIEWS OF THE DRAWINGS

In order to more clearly illustrate technical solutions in the embodiments of the disclosure or in current technologies, the drawings required for describing the embodiments or current technologies will be briefly introduced below. It is obvious that the following drawings are merely some embodiments of the disclosure, and a person having ordinary skill in this field can obtain other drawings according to these drawings under the premise of not paying creative works.

DESCRIPTION OF SPECIFIC EMBODIMENTS OF THE INVENTION

The following embodiments are described with reference to the accompanying drawings, which exemplify the realization of the disclosure. The directional terminologies of the disclosure, such as "top", "bottom", "front", "back", "left", "right", "inner", "outer", "side" and the like are merely the directions with reference to the accompanying drawings. Therefore, the aforesaid directional terminologies are used to describe and comprehend the disclosure without limiting the disclosure. In the drawings, the units having similar structures are marked by same numerals.

For current technologies, it cannot be ensured that gate on array (GOA) circuits output driving signals normally. The above deficiency can be solved in the embodiments of the present disclosure.

In GOA circuits, GOA units include level transfer circuits with positive-voltage GOA pulses and level transfer circuits with negative-voltage GOA pulses, which have been both described in the present disclosure.

Figure 1:
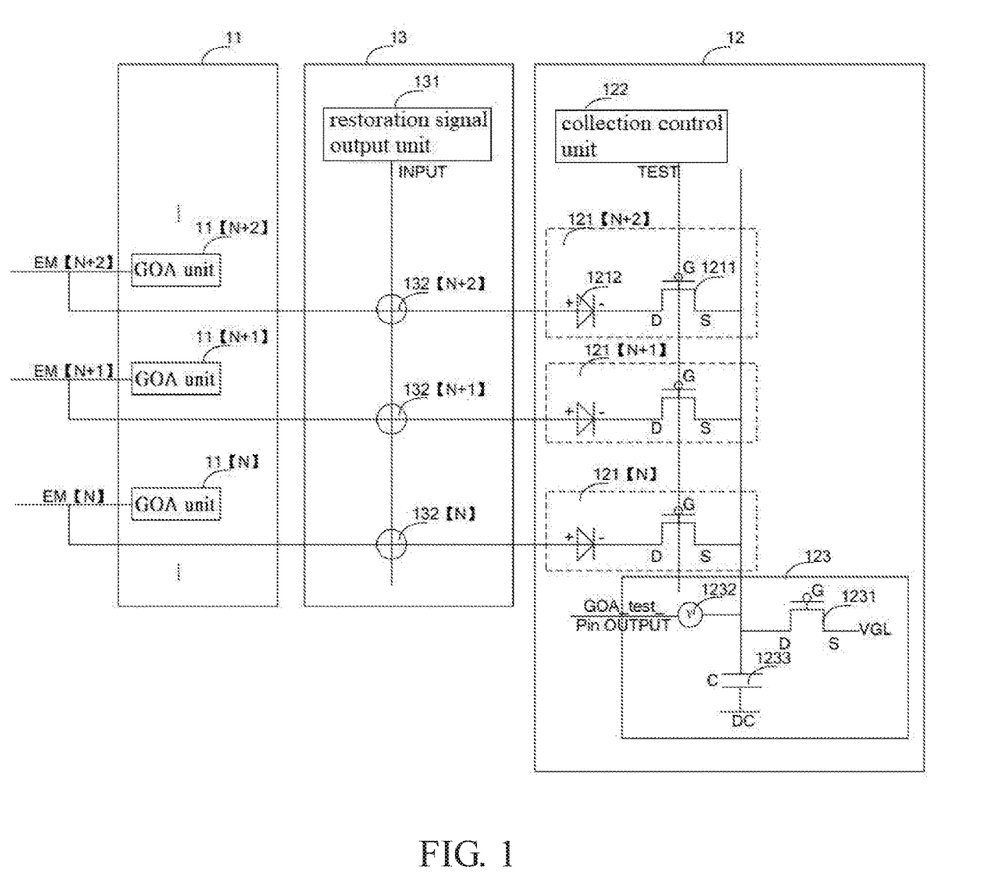
FIG. 1 is a circuit diagram of a gate on array (GOA) circuit according to a first embodiment of the present disclosure.

For a level transfer circuit with a positive-voltage GOA pulse, as shown in FIG. 1, the present disclosure provides a GOA circuit, including: at least one GOA unit 11 (e.g., GOA units 11[N] to 11[N+2] in FIG. 1), a GOA detection unit 12, and a GOA restoration unit 13, wherein:

a signal output end of the GOA unit 11 is electrically connected to pixels in a built-in touch display panel, and is configured to output a scan signal EM (i.e., signals EM[N] to EM[N+2] in FIG. 1) to the pixels;

the GOA detection unit 12 electrically connected to the signal output end of the GOA unit 11 is configured to collect the scan signal from the GOA unit and detect whether the scan signal from the GOA unit is abnormal so that an abnormal GOA unit is identified; and the GOA restoration unit 13 electrically connected to the signal output end of the GOA unit 11 is configured to restore a scan signal from the abnormal GOA unit 11.

In an embodiment, as shown in FIG. 1, the GOA detection unit 12 includes at least one signal collection unit 121, a collection control unit 122, and a pulse detection unit 123.

Each of the signal collection units 121 (e.g., signal collection units 121[N] to 121[N+2] in FIG. 1) electrically connected to a signal output end of a GOA unit 11 respectively is configured to transmit a scan signal of a corresponding GOA unit 11 to the pulse detection unit 123.

The collection control unit 122 electrically connected to all of the signal collection units is configured to output a control signal TEST in order to turn on or turn off each of the signal collection units.

The pulse detection unit 123 is configured to detect whether there exists a pulse in a scan signal from each GOA unit, and if there does not, then mark a corresponding GOA unit as an abnormal GOA unit.

In an embodiment, as shown in FIG. 1, the signal collection unit 121 includes a first thin-film transistor 1211, and an output end of the collection control unit 122 is electrically connected to a gate electrode G of the first thin-film transistor 1211.

In an embodiment, as shown in FIG. 1, the signal collection unit further includes a second thin-film transistor 1212, which is used as a unidirectional turn-on device and disposed between the signal output end of the GOA unit and the first thin-film transistor.

In an embodiment, as shown in FIG. 1, the pulse detection unit 123 includes a third thin-film transistor 1231, a voltage testing device 1232, and a capacitor 1233, wherein:

a gate electrode of the third thin-film transistor 1231 is electrically connected to a restoration signal RESET, a source electrode S of the third thin-film transistor is connected to a voltage level control signal, which is a low voltage level (VGL) signal in a scene of the present application, and a drain electrode D of the third thin-film transistor is electrically connected to the voltage testing device and one end of the capacitor;

the other end of the capacitor is connected to a power DC; and the voltage testing device 1232 is configured to detect whether there exists a corresponding voltage pulse in the scan signal from each GOA unit.

In an embodiment, as shown in FIG. 1, the GOA restoration unit 13 includes at least one restoration signal output unit 131, and the restoration signal output unit 131 is physically connected to the signal output end of the GOA unit 11 through a restoration point 132 and configured to output a restoration signal INPUT which is the same as a scan signal of a corresponding GOA unit. The restoration points 132 include restoration points 132[N] to 132[N+2] in FIG. 1.

In an embodiment, as shown in FIG. 1, the restoration signal output unit is connected to the signal output ends of at least two GOA units through at least two restoration points. In other embodiments, a plurality of restoration signal output units 131 can be used to output a plurality of different restoration signals INPUT so that the restoration of a plurality of abnormal GOA units can be realized.

Figure 2:
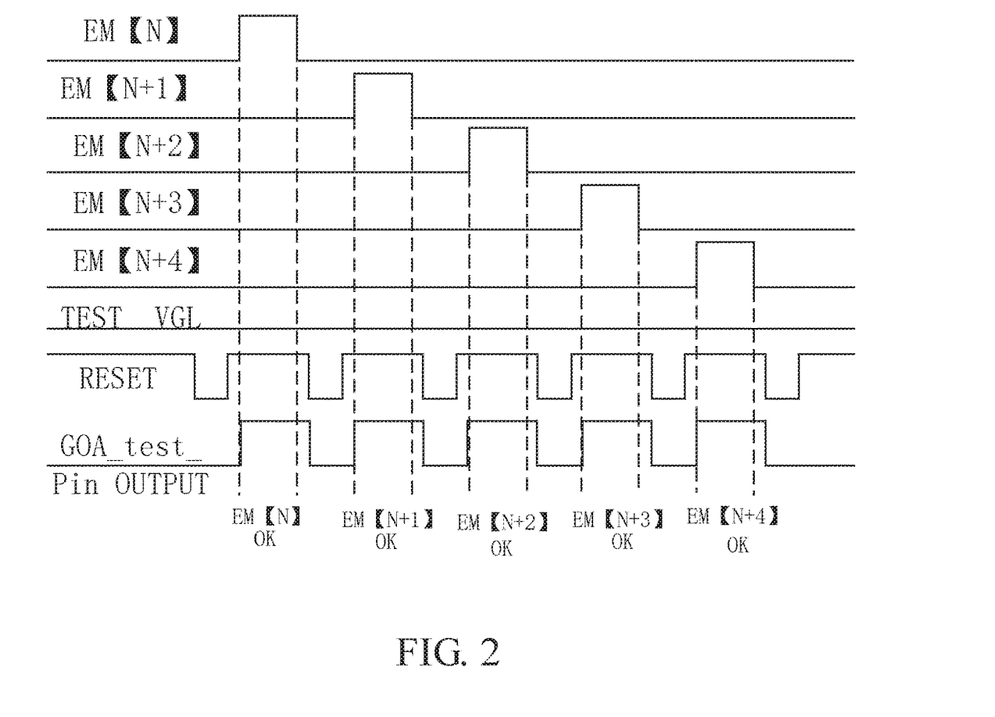
FIG. 2 is a signal diagram while a GOA circuit is normal according to the first embodiment of the present disclosure.
Figure 3:
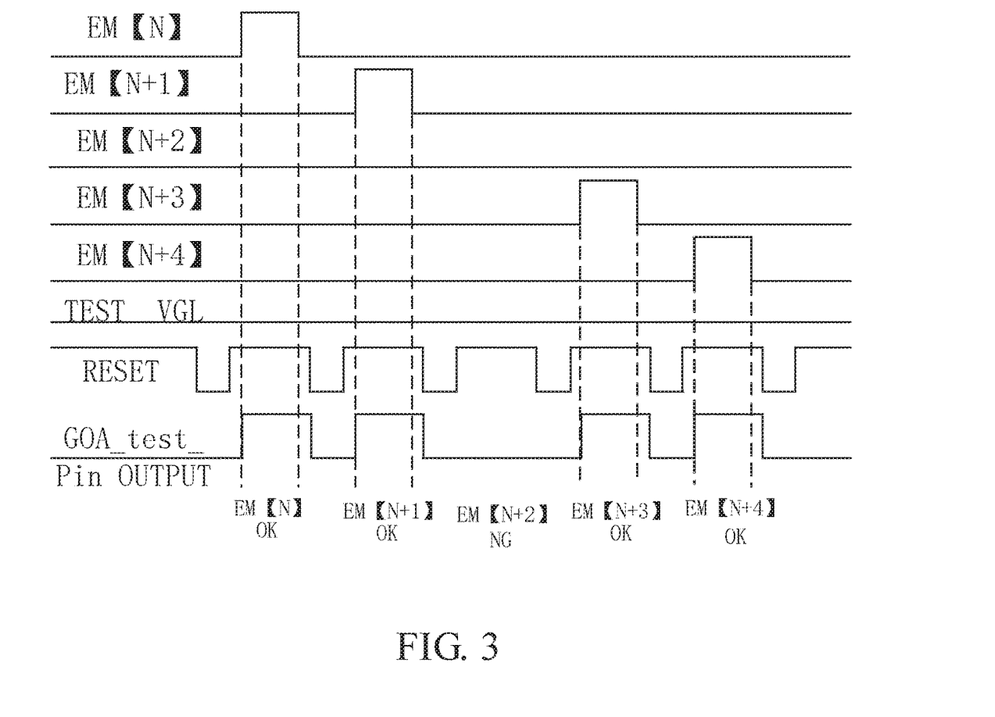
FIG. 3 is a signal diagram while a GOA circuit is abnormal according to the first embodiment of the present disclosure.

In the scene of the present application, when a high voltage level is given to the control signal TEST, a function of maintaining a GOA circuit is turned off. That is, when a high voltage level (VGH) is given to the control signal TEST, a GOA maintenance system can be turned off, and a GOA unit can work properly. When a low voltage level (VGL) is given to the control signal TEST, the GOA maintenance system is turned on, and the signal level-transfer function of a GOA unit is not affected by a detection system under protection of a unidirectional turn-on device. As shown in FIG. 2 or FIG. 3, signals EM[N] to EM[N+4] represent output signals of the GOA units respectively; the signal RESET, which starts before the beginning of the output signal of the each of the GOA units, is an alternating current (AC) signal and used to restore the whole detection system; and GOA_test_Pin OUTPUT represents a waveform detected by the voltage testing device 1232.

Figure 4:
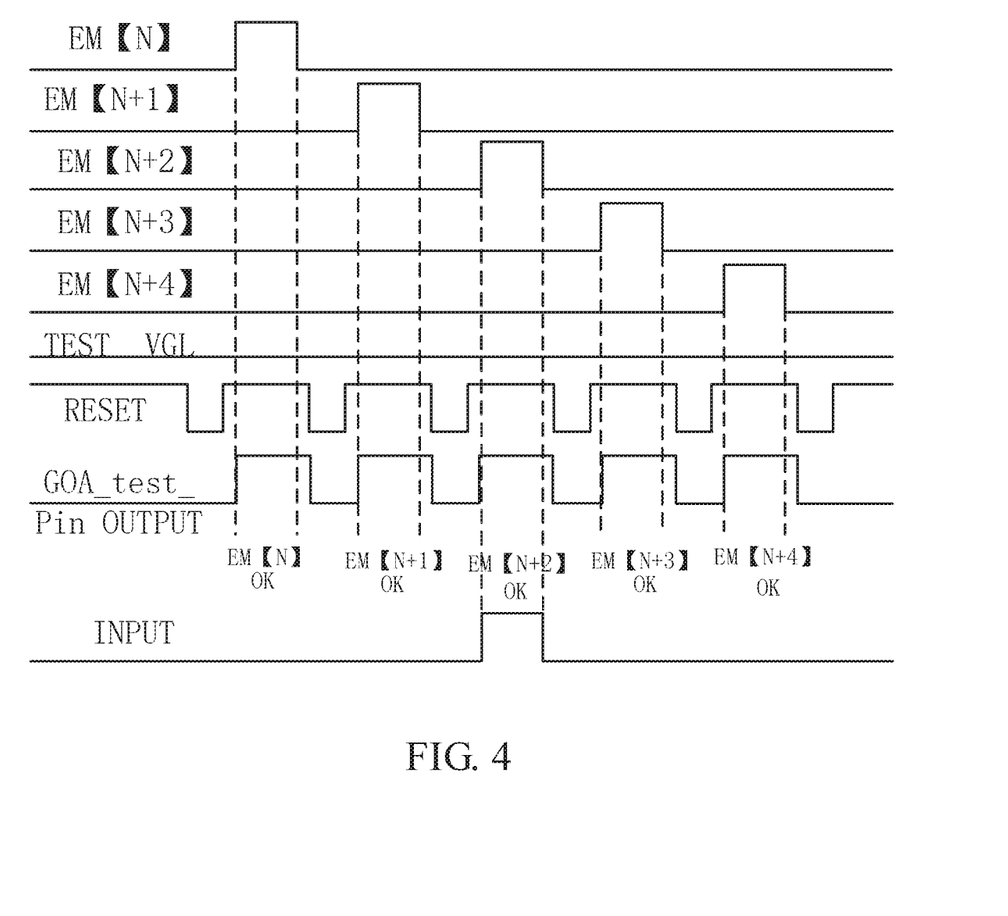
FIG. 4 is a signal diagram while a GOA circuit is being restored according to the first embodiment of the present disclosure.

As shown in FIG. 3, a pulse does not appear in a time corresponding to the signal EM[N+2] in a detection waveform because of a no-good (NG) signal EM[N+2]. However, the detection waveforms in FIG. 2 show that each stage of GOA units corresponds to a normal detection pulse, that is, signals EM[N] to EM[N+4] are all normal. Thus, a no-good (NG) signal of each stage of GOA units can be quickly and accurately found through the above method, and it is good to accurately position and parse GOA issues and to filter panels. As shown in FIG. 4, after positioning abnormalities, signal INPUT is configured as a normal signal EM[N+2] so that the restoration of signal EM[N+2] is realized.

Figure 5:
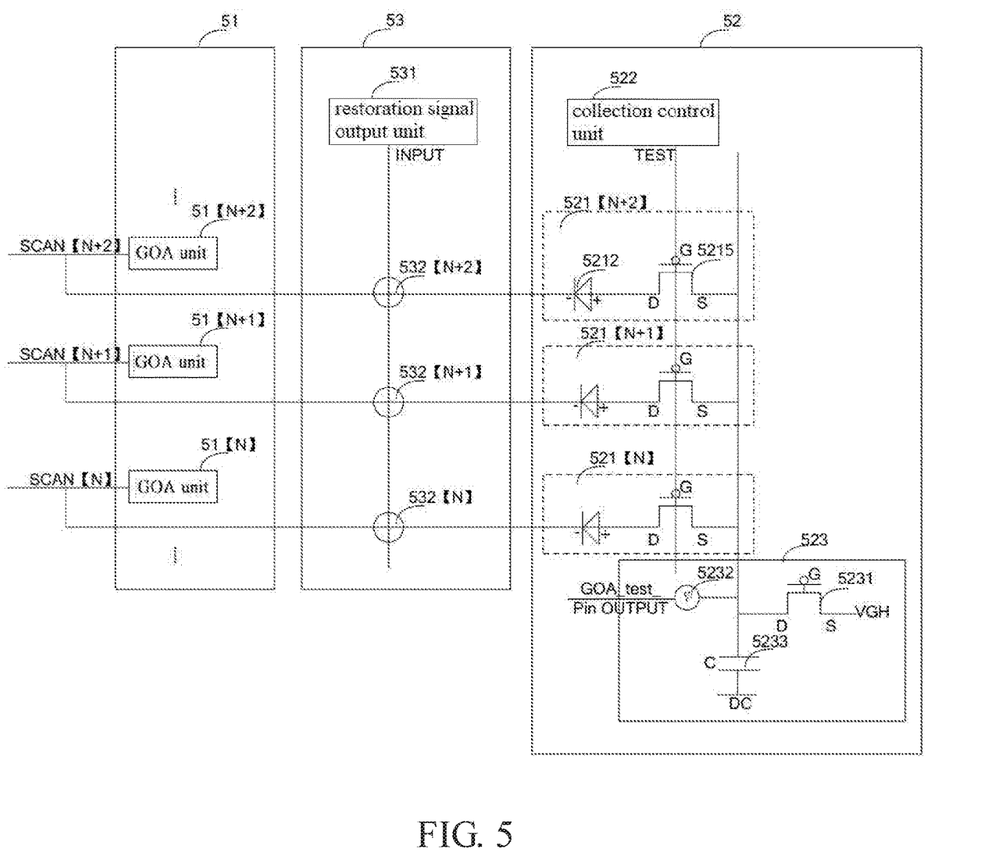
FIG. 5 is a circuit diagram of a gate on array (GOA) circuit according to a second embodiment of the present disclosure.

For a level transfer circuit with a negative-voltage GOA pulse, as shown in FIG. 5, the present disclosure provides a GOA circuit, including: at least one GOA unit 51 (e.g., GOA units 51[N] to 51[N+2] in FIG. 5), a GOA detection unit 52, and a GOA restoration unit 53, wherein:

a signal output end of the GOA unit 51 is electrically connected to pixels in a built-in touch display panel, and is configured to output a scan signal SCAN (i.e., signals SCAN[N] to SCAN[N+2] in FIG. 5) to the pixels;

the GOA detection unit 52 electrically connected to the signal output end of the GOA unit 51 is configured to collect the scan signal from the GOA unit and detect whether the scan signal from the GOA unit is abnormal so that an abnormal GOA unit is identified; and the GOA restoration unit 53 electrically connected to the signal output end of the GOA unit 51 is configured to restore a scan signal from the abnormal GOA unit 51.

In an embodiment, as shown in FIG. 5, the GOA detection unit 52 includes at least one signal collection unit 521, a collection control unit 522, and a pulse detection unit 523.

Each of the signal collection units 521 (e.g., signal collection units 521[N] to 521[N+2] in FIG. 5) electrically connected to a signal output end of a GOA unit 51 respectively is configured to transmit a scan signal of a corresponding GOA unit 51 to the pulse detection unit 523.

The collection control unit 522 electrically connected to all of the signal collection units is configured to output a control signal TEST in order to turn on or turn off each of the signal collection units.

The pulse detection unit 523 is configured to detect whether there exists a pulse in a scan signal from each GOA unit, and if there does not, then mark a corresponding GOA unit as an abnormal GOA unit.

In an embodiment, as shown in FIG. 5, the signal collection unit 521 includes a first thin-film transistor 5211, and an output end of the collection control unit 522 is electrically connected to a gate electrode G of the first thin-film transistor 5211.

In an embodiment, as shown in FIG. 5, the signal collection unit further includes a second thin-film transistor 5212, which is used as a unidirectional turn-on device and disposed between the signal output end of the GOA unit and the first thin-film transistor.

In an embodiment, as shown in FIG. 5, the pulse detection unit 523 includes a third thin-film transistor 5231, a voltage testing device 5232, and a capacitor 5233, wherein:

a gate electrode of the third thin-film transistor 5231 is electrically connected to a restoration signal RESET, a source electrode S of the third thin-film transistor is connected to a voltage level control signal, which is a high voltage level (VGH) signal in the scene of the present application, and a drain electrode D of the third thin-film transistor is electrically connected to the voltage testing device and one end of the capacitor;

the other end of the capacitor is connected to a power DC; and the voltage testing device 5232 is configured to detect whether there exists a corresponding voltage pulse in the scan signal from each GOA unit.

In an embodiment, as shown in FIG. 5, the GOA restoration unit 53 includes at least one restoration signal output unit 531, and the restoration signal output unit 531 is physically connected to the signal output end of the GOA unit 51 through a restoration point 532 and configured to output a restoration signal INPUT which is the same as a scan signal of a corresponding GOA unit.

In an embodiment, as shown in FIG. 5, the restoration signal output unit is connected to the signal output ends of at least two GOA units through at least two restoration points. In other embodiments, a plurality of restoration signal output units 531 can be used to output a plurality of different restoration signals INPUT so that the restoration of a plurality of abnormal GOA units can be realized.

Figure 6:
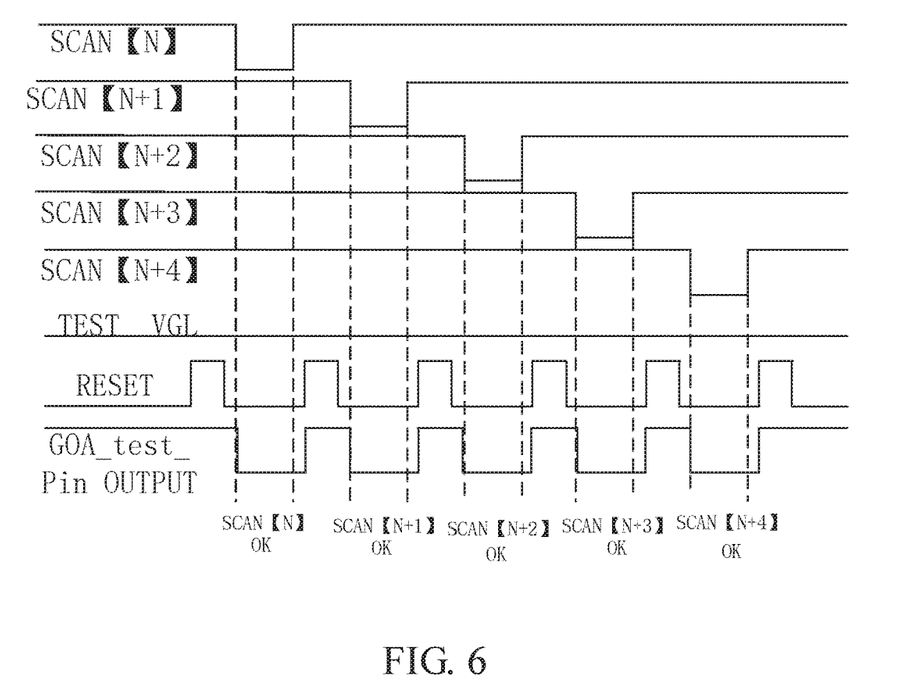
FIG. 6 is a signal diagram while a GOA circuit is normal according to the second embodiment of the present disclosure.
Figure 7:
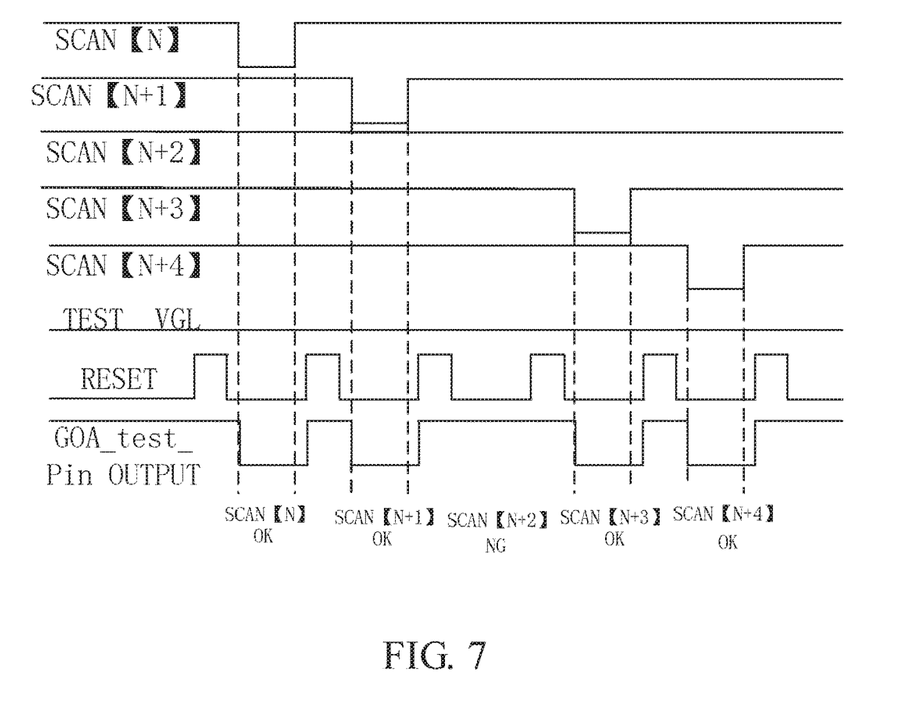
FIG. 7 is a signal diagram while a GOA circuit is abnormal according to the second embodiment of the present disclosure.

In the scene of the present application, when a high voltage level is given to the control signal TEST, the function of maintaining a GOA circuit is turned off. That is, when a high voltage level (VGH) is given to the control signal TEST, the GOA maintenance system can be turned off, and the GOA unit can work properly. When a low voltage level (VGL) is given to the control signal TEST, the GOA maintenance system is turned on, and the signal level-transfer function of a GOA unit isn't affected by a detection system under protection of a unidirectional turn-on device. As shown in FIG. 6 or FIG. 7, signals SCAN[N] to SCAN[N+4] represent output signals of the GOA units respectively; the signal RESET, which starts before the beginning of the output signal of the each of the GOA units, is an AC signal and used to restore the whole detection system; and GOA_test_Pin OUTPUT represents a waveform detected by the voltage testing device 5232. As shown in FIG. 7, a pulse doesn't appear in a time corresponding to the signal SCAN[N+2] in a detection waveform because of a no-good (NG) signal SCAN[N+2]. However, the detection waveforms in FIG. 6 show that each stage of GOA units corresponds to a normal detection pulse, that is, signals SCAN[N] to SCAN[N+4] are all normal. Thus, a no-good (NG) signal of each stage of GOA units can be quickly and accurately found through the above method, and it is good to accurately position and parse GOA issues and to filter panels.

In an embodiment, the second thin-film transistor can be a p-channel metal oxide semiconductor (PMOS) thin-film transistor, and can also be an n-channel metal oxide semiconductor (NMOS) thin-film transistor.

In an embodiment, as shown in FIG. 9(a), the second thin-film transistor is a PMOS thin-film transistor, and a gate electrode G and a drain electrode D of the PMOS thin-film transistor are connected with a short circuit.

In an embodiment, as shown in FIG. 9(b), the second thin-film transistor is an NMOS thin-film transistor, and a gate electrode G and a source electrode S of the NMOS thin-film transistor are connected with a short circuit.

Figure 9:
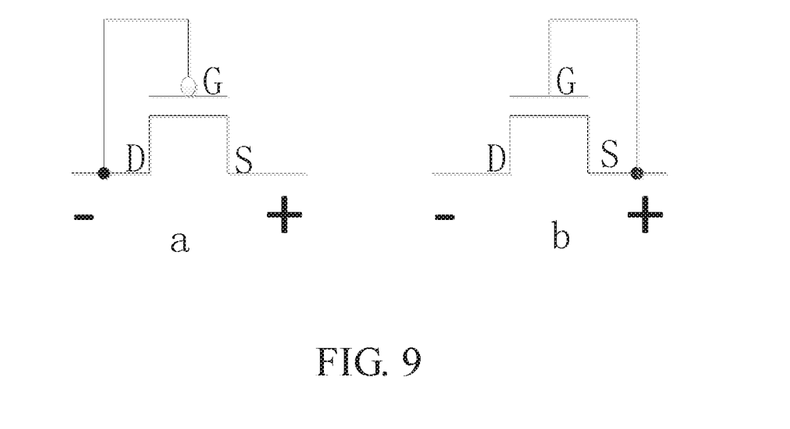
FIG. 9 is a circuit diagram of a second thin-film transistor according to an embodiment of the present disclosure.
Figure 10:
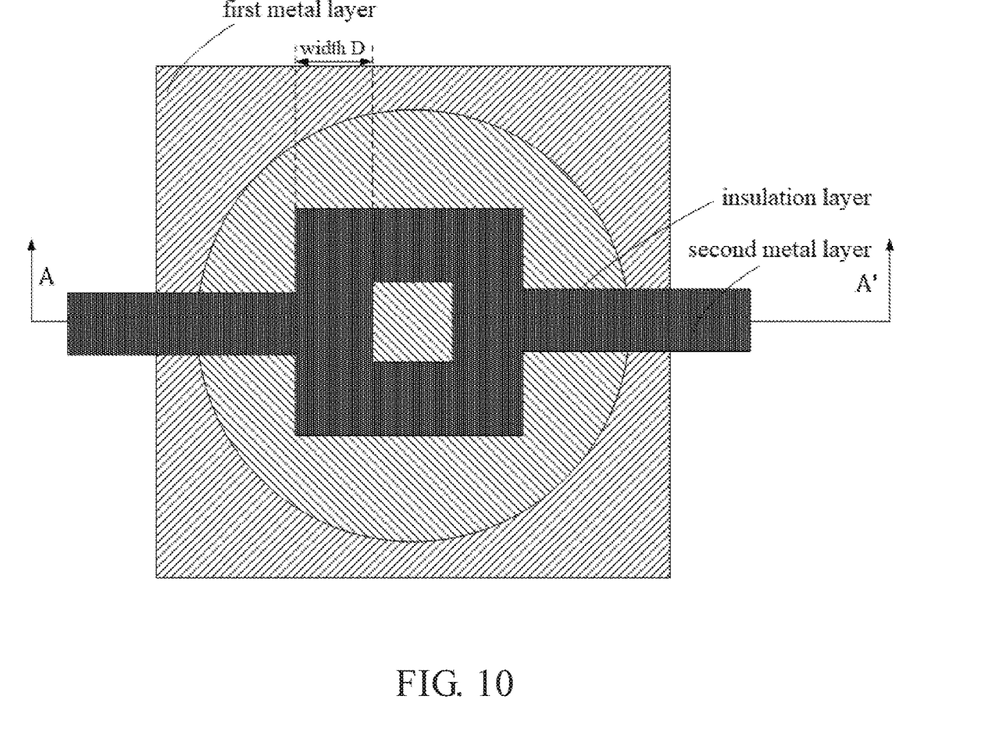
FIG. 10 is a top view of a restoration point in an insulation state according to an embodiment of the present disclosure.
Figure 11:
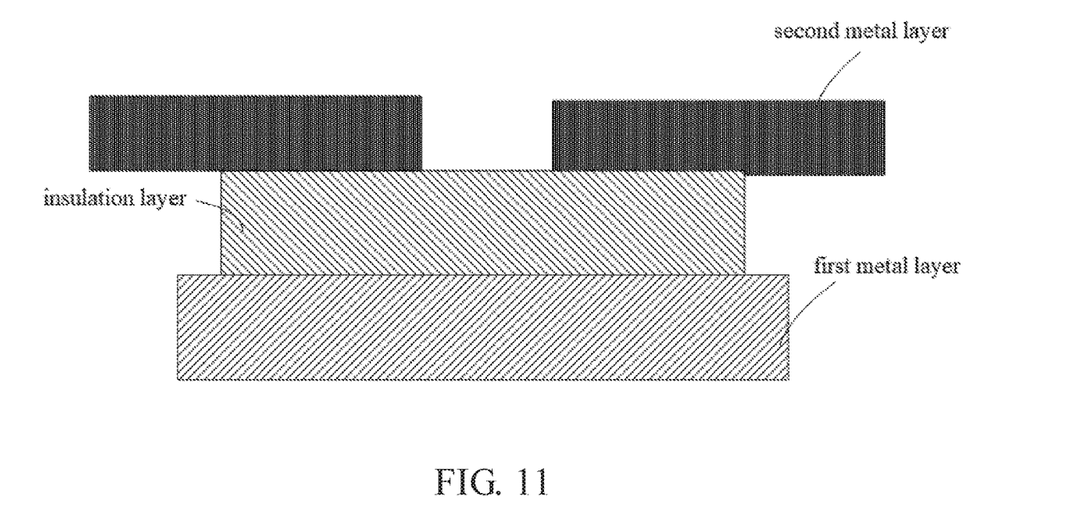
FIG. 11 is a cross-sectional view of a restoration point in an insulation state according to an embodiment of the present disclosure.
Figure 12:
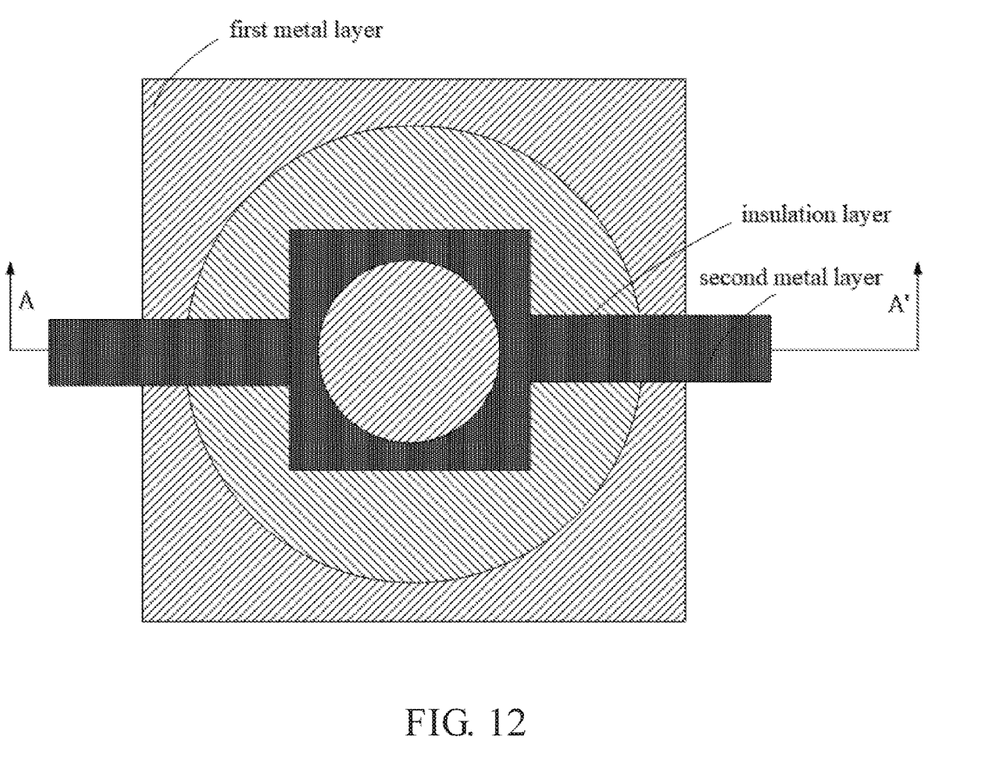
FIG. 12 is a top view of a restoration point in a conduction state according to an embodiment of the present disclosure.
Figure 13:
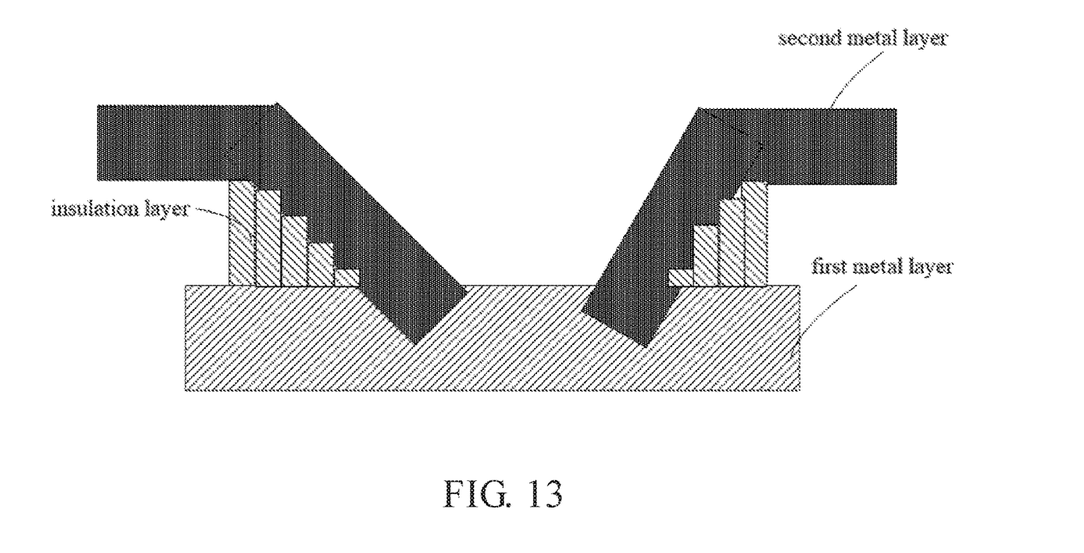
FIG. 13 is a cross-sectional view of a restoration point in a conduction state according to an embodiment of the present disclosure.

In an embodiment, as shown in FIG. 1 and FIG. 9, the GOA unit is a level transfer circuit with a positive-voltage GOA pulse, the first thin-film transistor is a PMOS thin-film transistor, the second thin-film transistor is a PMOS thin-film transistor, a source electrode S of the second thin-film transistor is electrically connected to the signal output end of the GOA unit, a drain electrode D of the second thin-film transistor is electrically connected to a drain electrode D of the first thin-film transistor, and a source electrode S of the first thin-film transistor is electrically connected to a signal input end of the pulse detection unit 123.

In an embodiment, as shown in FIG. 1 and FIG. 9, the GOA unit is a level transfer circuit with a positive-voltage GOA pulse, the first thin-film transistor is a PMOS thin-film transistor, the second thin-film transistor is an NMOS thin-film transistor, a source electrode S of the second thin-film transistor is electrically connected to the signal output end of the GOA unit, a drain electrode D of the second thin-film transistor is electrically connected to a drain electrode D of the first thin-film transistor, and a source electrode S of the first thin-film transistor is electrically connected to a signal input end of the pulse detection unit 123.

In an embodiment, as shown in FIG. 5 and FIG. 9, the GOA unit is a level transfer circuit with a negative-voltage GOA pulse, the first thin-film transistor is a PMOS thin-film transistor, the second thin-film transistor is a PMOS thin-film transistor, a drain electrode D of the second thin-film transistor is electrically connected to the signal output end of the GOA unit, a source electrode S of the second thin-film transistor is electrically connected to a drain electrode D of the first thin-film transistor, and a source electrode S of the first thin-film transistor is electrically connected to a signal input end of the pulse detection unit 123.

In an embodiment, as shown in FIG. 5 and FIG. 9, the GOA unit is a level transfer circuit with a negative-voltage GOA pulse, the first thin-film transistor is a PMOS thin-film transistor, the second thin-film transistor is an NMOS thin-film transistor, a drain electrode D of the second thin-film transistor is electrically connected to the signal output end of the GOA unit, a source electrode S of the second thin-film transistor is electrically connected to a drain electrode D of the first thin-film transistor, and a source electrode S of the first thin-film transistor is electrically connected to a signal input end of the pulse detection unit 123.

In an embodiment, when the restoration point, with a conduction state and an insulation state, is in the conduction state, the restoration signal output unit is electrically connected to the signal output end of the GOA unit.

In an embodiment, as shown in FIG. 10 to FIG. 13, the restoration point 132 or the restoration point 532 includes a first metal layer, a second metal layer, and an insulation layer disposed between the first metal layer and the second metal layer. The first metal layer is electrically connected to the signal output end of the GOA unit 11, and the second metal layer is electrically connected to the restoration signal output unit.

In an embodiment, as shown in FIG. 10 to FIG. 13, the second metal layer is disposed on the first metal layer for the convenience of a design of a circuit layout.

In an embodiment, as shown in FIG. 10 to FIG. 13, the second metal layer has a shape of a hollow rectangle, and a width D of the hollow rectangle is greater than a thickness of the insulation layer.

In an embodiment, a width D of the hollow rectangle is twice as long as a thickness of the insulation layer in order to ensure contacting stability between the first metal layer and the second metal layer.

In an embodiment, the second metal layer has a shape of a circular ring.

An insulation layer can be cleared by laser. Therefore, when a scan signal from a GOA unit needs to be restored, clearing an insulation layer by laser can be used.

For example, a GOA circuit having twenty GOA units, whose only a fourteenth GOA unit is abnormal, will be illustrated based on the present disclosure.

Figure 14:
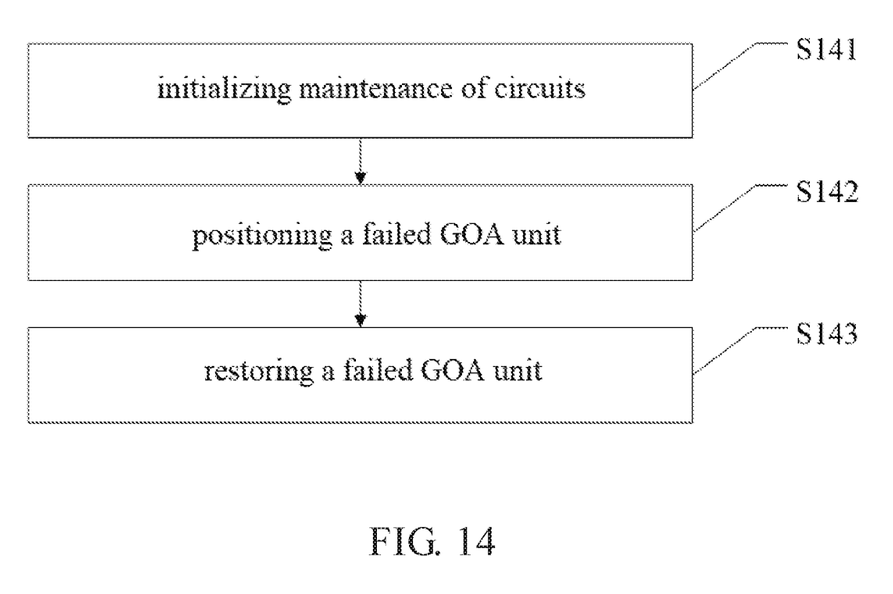
FIG. 14 is a flow chart of a method for maintaining a GOA circuit according to an embodiment of the present disclosure.

As shown in FIG. 14, a method for maintaining a GOA circuit, provided in the present disclosure, includes the following steps:

S141: initializing maintenance of circuits.

For a level transfer circuit with a positive-voltage GOA pulse, the source electrode S of the third thin-film transistor 1231 is configured to connect with a low voltage level (VGL) signal. For a level transfer circuit with a negative-voltage GOA pulse, the source electrode S of the third thin-film transistor 5231 is configured to connect with a high voltage level (VGH) signal.

A signal TEST is configured as a low voltage level (VGL) signal.

S142: positioning a failed GOA unit.

An abnormality of a fourteenth GOA unit is detected through normal operation of the GOA circuit.

S143: restoring a failed GOA unit.

Figure 8:
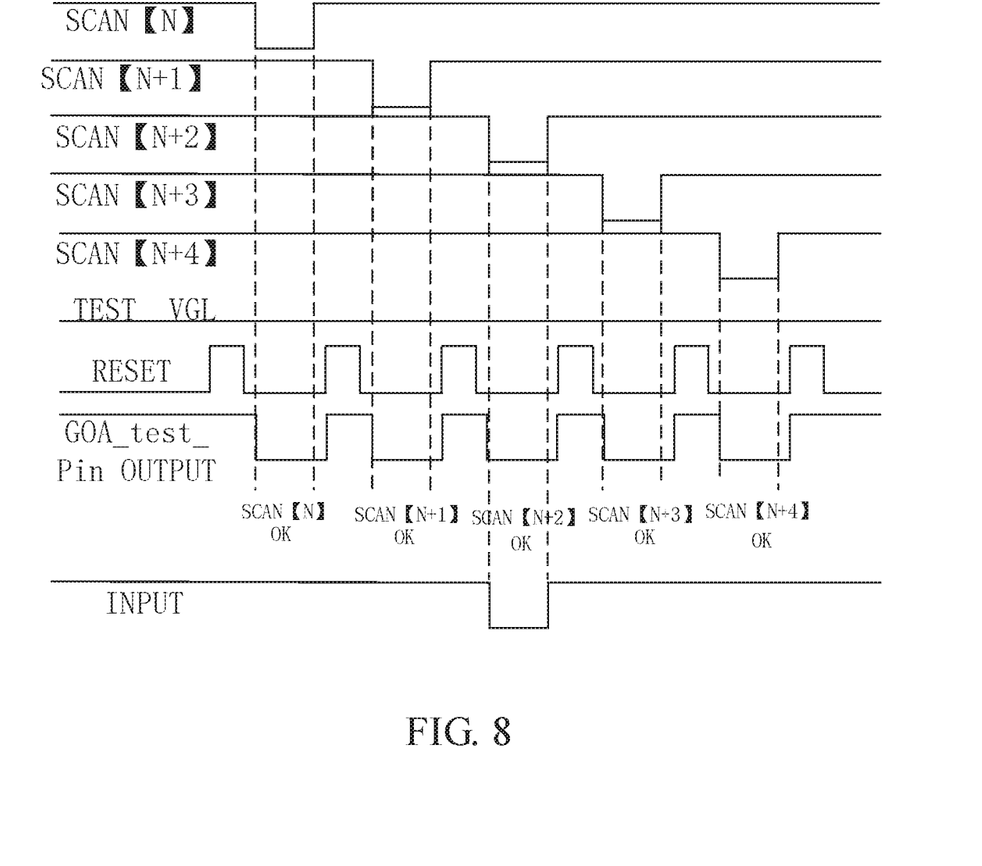
FIG. 8 is a signal diagram while a GOA circuit is being restored according to the second embodiment of the present disclosure.

As shown in FIG. 4 or FIG. 8, a signal INPUT is configured to be the same as a driving signal from the fourteenth GOA unit.

An insulation layer of a restoration point between a restoration unit and the fourteenth GOA unit is cleared by using a laser method so that a restoration is completed Specifically, as shown in FIG. 3, through a detection function, it is known that a signal EM[N+2] is not outputted normally. Meanwhile, as shown in FIG. 4, a signal INPUT is set to be a waveform of a normal signal EM[N+2] of a GOA unit, and a restoration point (i.e., a point of a weld) between a line corresponding to a signal INPUT and an output signal EM[N+2] of the GOA unit GOA[N+2] is welded by laser. When a GOA circuit is driven, a signal INPUT is inputted to an abnormal GOA unit, and thus the restoration of a failed GOA unit can be realized.

Specifically, as shown in FIG. 7, through a detection function, it is known that a signal SCAN[N+2] is not outputted normally. Meanwhile, as shown in FIG. 8, a signal INPUT is set to be a waveform of a normal signal SCAN[N+2] of a GOA unit, and a restoration point (i.e. a point of weld) between a line corresponding to a signal INPUT and an output signal SCAN[N+2] of the GOA unit GOA[N+2] is welded by laser. When a GOA circuit is driven, a signal INPUT is inputted to an abnormal GOA unit, and thus the restoration of a failed GOA unit can be realized.

In the embodiments of the present disclosure, a built-in touch display panel is further provided. The built-in touch display panel includes the above GOA circuit which can be understood by specifically referring to the foregoing discussion without repetition here.

It can be understood based on the foregoing embodiments:

a GOA circuit and a built-in touch display panel, provided in the present disclosure, collect a scan signal from the GOA unit, detect whether the scan signal from the GOA unit is abnormal in order to identify an abnormal GOA unit, and then restore a scan signal from the abnormal GOA unit. Thus, it is ensured that the GOA circuit can output driving signals normally, and a yield of products is increased.

In conclusion, although the present disclosure has been disclosed with reference to the foregoing preferred embodiments thereof, it is not limited to the foregoing preferred embodiments. For those skilled in the art, a variety of modifications and changes may be made without departing from the scope of the present disclosure which is intended to be defined by the appended claims.

What is claimed is:

1. A gate on array (GOA) circuit, comprising: a plurality of GOA units, a GOA detection unit, and a GOA restoration unit, wherein:

a signal output end of the GOA units is electrically connected to pixels in a built-in touch display panel, and is configured to output a scan signal to the pixels;

the GOA detection unit is electrically connected to the signal output end of the GOA units and configured to collect the scan signal from the GOA units and detect whether the scan signal from the GOA units is abnormal so that an abnormal GOA unit is identified; and the GOA restoration unit is electrically connected to each signal output end of the GOA units and configured to restore a scan signal from the abnormal GOA unit;

wherein the GOA detection unit comprises at least one signal collection unit, a collection control unit, and a pulse detection unit, wherein:

the signal collection unit is electrically connected to the signal output end of the GOA units and configured to transmit a scan signal of a corresponding GOA unit to the pulse detection unit;

the collection control unit is electrically connected to the at least one signal collection unit and configured to output a control signal in order to turn on or turn off the at least one signal collection unit; and the pulse detection unit is configured to detect whether there exists a pulse in the scan signal from the GOA units, and if there does not, then mark a corresponding GOA unit as the abnormal GOA unit; and wherein the pulse detection unit comprises a third thin-film transistor, a voltage testing device, and a capacitor, wherein:

a gate electrode of the third thin-film transistor is electrically connected to a restoration signal, a source electrode of the third thin-film transistor is connected to a voltage level control signal, and a drain electrode of the third thin-film transistor is electrically connected to the voltage testing device and one end of the capacitor;

the other end of the capacitor is connected to a power; and the voltage testing device is configured to detect whether there exists a corresponding voltage pulse in the scan signal from the GOA units.

2. The GOA circuit according to claim 1, wherein the signal collection unit comprises a first thin-film transistor, and an output end of the collection control unit is electrically connected to a gate electrode of the first thin-film transistor.

3. The GOA circuit according to claim 2, wherein the signal collection unit further comprises a second thin-film transistor, which is used as a unidirectional turn-on device and disposed between the signal output end of the GOA units and the first thin-film transistor.

4. The GOA circuit according to claim 3, wherein the second thin-film transistor is an n-channel metal oxide semiconductor (NMOS) thin-film transistor, and a gate electrode and a source electrode of the NMOS thin-film transistor are connected with a short circuit.

5. The GOA circuit according to claim 3, wherein the GOA units are a level transfer circuit with a positive-voltage GOA pulse, the first thin-film transistor is a PMOS thin-film transistor, the second thin-film transistor is a PMOS thin-film transistor, a source electrode of the second thin-film transistor is electrically connected to the signal output end of the GOA units, a drain electrode of the second thin-film transistor is electrically connected to a drain electrode of the first thin-film transistor, and a source electrode of the first thin-film transistor is electrically connected to a signal input end of the pulse detection unit.

6. The GOA circuit according to claim 3, wherein the GOA units are a level transfer circuit with a positive-voltage GOA pulse, the first thin-film transistor is a PMOS thin-film transistor, the second thin-film transistor is an NMOS thin-film transistor, a source electrode of the second thin-film transistor is electrically connected to the signal output end of the GOA units, a drain electrode of the second thin-film transistor is electrically connected to a drain electrode of the first thin-film transistor, and a source electrode of the first thin-film transistor is electrically connected to a signal input end of the pulse detection unit.

7. The GOA circuit according to claim 3, wherein the GOA units are a level transfer circuit with a negative-voltage GOA pulse, the first thin-film transistor is a PMOS thin-film transistor, the second thin-film transistor is an NMOS thin-film transistor, a drain electrode of the second thin-film transistor is electrically connected to the signal output end of the GOA units, a source electrode of the second thin-film transistor is electrically connected to a drain electrode of the first thin-film transistor, and a source electrode of the first thin-film transistor is electrically connected to a signal input end of the pulse detection unit.

8. The GOA circuit according to claim 1, wherein the GOA units are a level transfer circuit with a positive-voltage GOA pulse, and the voltage level control signal is a low voltage level signal.

9. The GOA circuit according to claim 1, wherein the GOA units are a level transfer circuit with a negative-voltage GOA pulse, and the voltage level control signal is a high voltage level signal.

10. The GOA circuit according to claim 1, wherein the GOA restoration unit comprises at least one restoration signal output unit, and wherein the restoration signal output unit is physically connected to the signal output end of the GOA units through a restoration point and configured to output a restoration signal which is the same as a scan signal of a corresponding GOA unit.

11. The GOA circuit according to claim 10, wherein the restoration signal output unit is connected to the signal output ends of at least two GOA units through at least two restoration points.

12. The GOA circuit according to claim 10, wherein, when the restoration point, with a conduction state and an insulation state, is in the conduction state, the restoration signal output unit is electrically connected to the signal output end of the GOA units.

13. The GOA circuit according to claim 10, wherein the restoration point comprises a first metal layer, a second metal layer, and an insulation layer disposed between the first metal layer and the second metal layer, and wherein the first metal layer is electrically connected to the signal output end of the GOA units, and the second metal layer is electrically connected to the restoration signal output unit.

14. The GOA circuit according to claim 13, wherein the second metal layer is disposed on the first metal layer.

15. The GOA circuit according to claim 14, wherein the second metal layer has a shape of a hollow rectangle, and a width of the hollow rectangle is greater than a thickness of the insulation layer.

16. A built-in touch display panel, comprising the GOA circuit according to claim 1.

* * * * *